Figure 5:
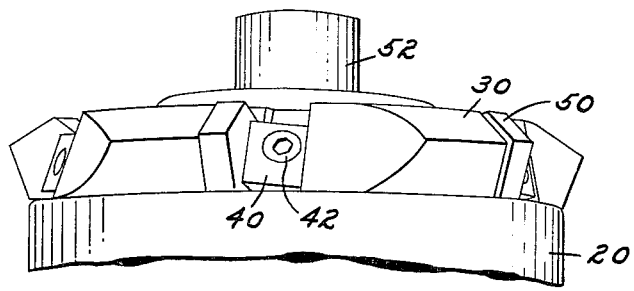

May 28, 1963  R. W. BERRY, JR  3,091,138
ROTATING CUTTER ASSEMBLY
Filed Dec. 7, 1959  3 Sheets-Sheet 1
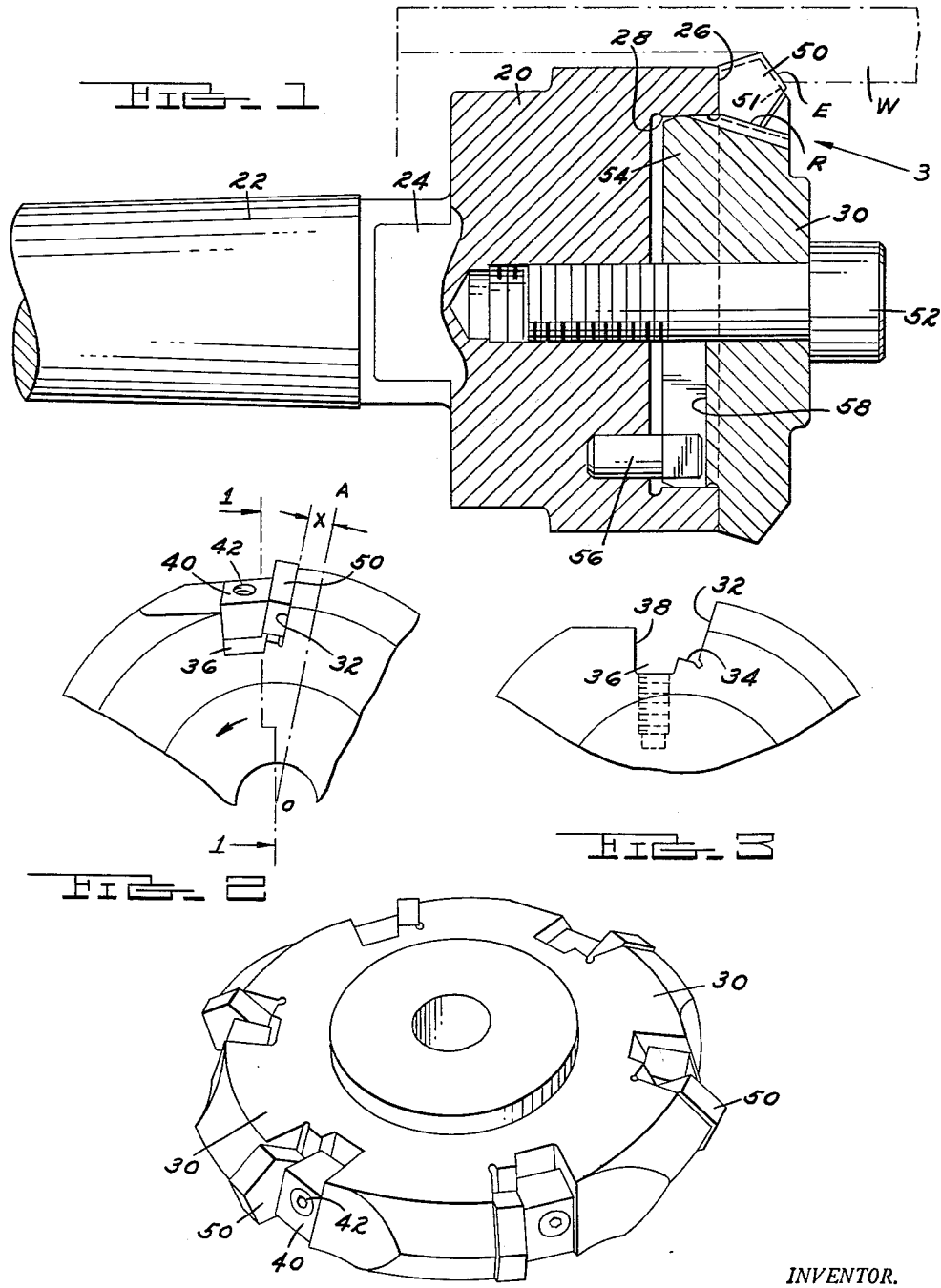
INVENTOR.
ROBERT W. BERRY, JR.
BY
Barnes, Kisselle,
Raisch & Choate
ATTORNEYS INVENTOR.
ROBERT W. BERRY, JR.
BY
Barnes, Kisselle, Raisch & Choate
ATTORNEYS May 28, 1963 R. W. BERRY, JR 3,091,138
ROTATING CUTTER ASSEMBLY
Filed Dec. 7, 1959 3 Sheets-Sheet 3

INVENTOR.
ROBERT W. BERRY, JR.
BY
Barnes, Kisselle, Raisch & Choate
ATTORNEYS

United States Patent Office 3,091,138
Patented May 28, 1963

3,091,138
ROTATING CUTTER ASSEMBLY
Robert W. Berry, Jr., Ferndale, Mich., assignor, by mesne assignments, to Wesson Corporation, Ferndale, Mich., a corporation of Delaware
Filed Dec. 7, 1959, Ser. No. 857,845
9 Claims. (Cl. 77—58)

This invention relates to a cutter device for the use of what are now termed "throwaway inserts."

Flat wafer-like inserts for milling and boring cutters have been disclosed for use in milling cutters. One example is found in the Mattson Patent No. 1,460,029, dated June 26, 1923, wherein circular or octagonal wafers of a cutting material were squeezed in a slot of a milling cutter periphery to provide the necessary cutting edges. This type of cutting element was "positive" in the sense that the edges were beveled to provide the adquate work clearance required. Also, the edge support for the inserts was strictly radial.

In about 1949 Begle and Gaudreau devised a milling cutter for flat pellet-like inserts of octagonal shape as illustrated in Patent No. 2,690,610, dated October 5, 1954. The type of pellet suggested by Begle and Gaudreau was the so-called "fully negative" pellet wherein the edges of the inserts were normal to the parallel flat faces of the insert. In order to obtain the necessary work clearance on this device, the inserts were mounted in the cutter against surfaces which were tilted away from the direction of rotation of the cutter body about axes extending both parallel and at right angle to the axis of the body. This double angle mounting provided the necessary clearance for the cutting edges as applied to the work. Subsequently to the Begle-Gaudreau development, fully negative throwaway milling cutters have been increasingly becoming more popular and the tungsten carbide inserts have either been of the type using the "positive" insert with the beveled edge or they have been mounted at the double angles for a square edge insert to provide necessary cutting clearance.

One of the problems in connection with the manufacture of these double negative milling cutters has been the cost of set-up and the difficulties in providing the proper back-up surfaces for the edges of the inserts which would be accurate and yet easily formed in a machining sense. In some instances, when a ring is used for a back up for the blades, some manufacturers have notched the surface to provide a solid back-up for the blades.

It is an object of the present invention to provide a cutter which can be formed with a single angled deviation for the slot from the axis of the milling cutter and providing an insert with a base support of such design that clearance is inherent in the structure. Also, it is an object to provide a cutter design which affords solid flat supporting surfaces for the inserts without any special notching operation.

It is a further object therefore to provide a cutter design in which the machining of the cutter body is reduced to a single angle which is readily controlled and readily checked to avoid another complexity in the manufacture of double negative cutters, namely the difficulty of checking the angles once they were ground into the body.

Another feature of the invention is a solid, flat, axial back-up for the inserts created by a simple radial surface. The formation of this surface is facilitated by a two-piece body construction which simplifies the entire machining operation for the assembly.

Other objects and features of the invention relating to details of construction and operation will be apparent in the following description and claims.

Drawings accompany the disclosure and the various views thereof may be briefly described as:

FIGURE 1, a sectional view of a boring cutter illustrating the manner in which the parts are related.

FIGURE 2, an end view of FIGURE 1 showing the check line of FIGURE 1.

FIGURE 3, an end view at an angle on line 3 of FIGURE 1 illustrating the shape of the receiving slot.

FIGURE 4, a perspective view of the insert holding body.

FIGURE 5, a view of the cutter of FIGURE 4 assembled on to a shaft.

Figure 6:
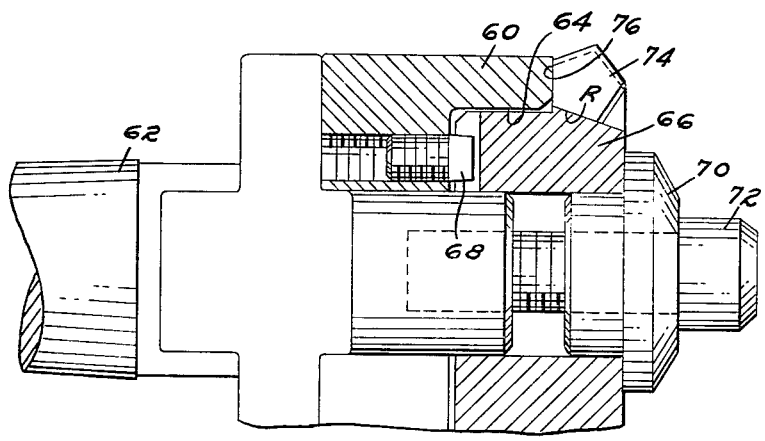

FIGURE 6, a view of a modified construction in which the slots are placed in an adaptor ring.

Figure 7:
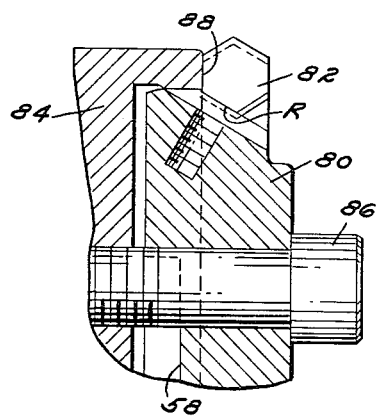

FIGURE 7, a view of a cutter similar to that shown in FIGURE 6 utilizing a hexagonal shape insert.

Figure 8:
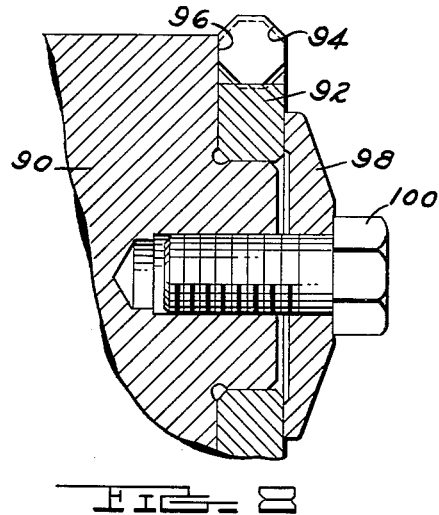

FIGURE 8, a modified view showing a holder for an octagonal insert utilizing a slotted ring.

Figure 9:
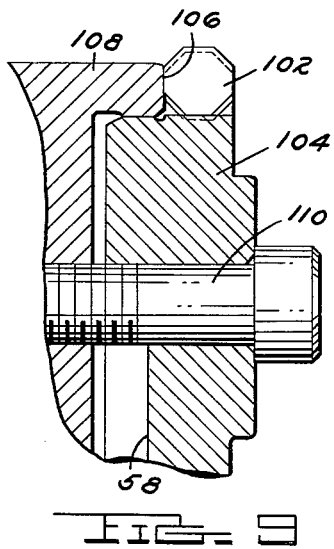

FIGURE 9, a view of a modified holder for hexagonal inserts.

Figure 10:
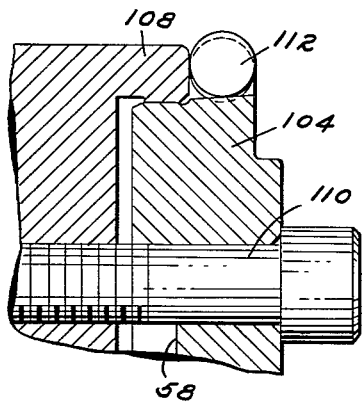

FIGURE 10, a view of a holder for circular inserts.

Referring to the drawings, in FIGURE 1, a first porportion of the cutter body 20, having a tapered mounting shaft 22 and driving lugs 24, is shown provided with a flat radial face 26 extending radially outside of a recess 28 countersunk in the surface of the face of the body 20. The insert holder itself comprises an insert disc body 30, provided with a plurality of straight-pass notches or recesses 32, having a bottom seat 34 for one edge of an insert and a wedge recess 36 with a back pressure wall 38.

The surface 32 is set at negative rake from the radius as shown in FIGURE 2, in that it is set, with respect to direction of rotation, ahead of the radius O—A a distance X which will vary with the size of the cutter. In a cutter about 3½ inches in diameter, this distance X may be about .115 inch and the cutting edge of the insert is spaced an additional distance from O—A in the amount equal to the thickness of the insert. The plane of surface 32 is parallel to a plane passing through the axis of the cutter and radius O—A. Where the face of the cutter is normal to the axis, the reference plane can be described as perpendicular to the face of the cutter. The surface 32 is formed by a straight-pass perpendicular to the face of the cutter at zero degrees axial rake. As shown in FIGURES 2 and 3, this straight-pass is a simple machining operation compared to the compound angles required for square inserts. Suitable wedges 40 held in by a double lead screw 42 are used to lock a pentagonal insert 50 in the slot where they are supported by the surfaces 32 and 34.

As shown in FIGURE 1, one edge of the pentagonal insert is backed square and flat against the surface 26 on the body 20 so that the insert is fully supported at a suitable angle to provide the proper cutting clearance. It will be noted that the surface 26 is a simple flat radial surface easily and accurately formed on the face of the first cutter body 20.

The work W, in which the boring cutter is operating, is being machined by edge E of insert 50 and the dotted line 51 represents the trailing edge of the insert. The distance between the edge E and edge 51 is the true cutting clearance created by the shape of the insert when mounted in the slot disposed at the angle O—A. If surface 26 is referred to as a base surface, the cutting edge E of the insert is, by reason of the geometric perimeter of the insert, disposed at an acute angle thereto, the angles being preferably between 30° and 75° to maintain a sufficient amount of cutting clearance. The root surface R for the insert support is angled to correspond to the geometry of the insert and is flat and square against the edge of the insert to provide solid support therefor.

The insert body 30 is held in place by a bolt 52 and also has a disc-like extension 54 which is received snugly in the recess 28 of body 20. A suitable driving stud 56 in a radial recess 58 is provided. A view of the assembled device is shown in FIGURE 5. The insert holding body 30, as viewed in FIGURE 4, can be handled conveniently with the inserts removed, reset, the inserts indexed, etc., by simply removing bolt 52. Thus, the operator doesn't have to handle the heavy base 20 which remains on the spindle.

In FIGURE 6 a modified cutter construction is shown wherein an adaptor ring 60 is suitably mounted on a supported shaft 62 and provided with an internal recess 64 for receiving the shank of an insert body 66 driven through a stud 68 and held in place by a collar 70 and bolt 72.

The ring 66 is slotted as described in connection with ring 30 in FIGURE 1 to receive the pentagonal inserts 74, the slot having a suitable root base R for solid support of the inserts which back up axially against the face 76 of ring 60.

In FIGURE 7, a further modification is shown with an insert ring 80 carrying hexagonal inserts 82 being supported in a body 84 by a bolt 86, the hexagonal inserts being supported flat against a surface 88 on the body 84. Here again the angle of the base of the slot in ring 80 will correspond to the geometry of the insert, in this case a hexagon.

In FIGURE 8, a body 90 supports a ring 92 having open-ended slots for supporting octagonal inserts 94 backed up against a surface 96. The ring 92 is held in place by a disc 98 and bolt 100. With the octagonal inserts the base of the slots in the ring is parallel to the cutter axis.

In FIGURE 9, a hexagonal insert 102 is supported in a ring 104 against the surface 106 on a body 108, a bolt 110 serving to hold the elements in assembly. In each case a suitable driving connection is provided between the parts.

In FIGURE 10, a body 108 serves to support circular inserts 112 in a ring 104 similar to that shown in FIGURE 9.

In each of the embodiments of FIGURES 6 to 10 the clearance of the insert is shown by the dotted lines, the views being taken parallel to a radius, as shown on line 1—1 in FIGURE 2.

It will thus be seen that in each of the embodiments a simple machined slot perpendicular to the plane of the cutter body and provided with a suitable root angle provides a solid flat support, in connection with the cutter body, for two edges of a carbide insert, or ceramic if such is used. In each case also suitable cutting clearance results from the construction. In addition, the device is more economical to use since any damage due to a mishap will usually affect only the front plate or head which can be replaced on the old basic body or holder 20 which remains in the machine. This two-piece construction has an added advantage that the removable head is lighter and more easily handled by a workman when the machine is being set up.

What is claimed is as follows:

1. A boring cutter assembly combination comprising a circular body having a radial flat face, a separable circular body having radial faces positioned against said first body having a plurality of circumferentially spaced slots passing through said separable body in a direction perpendicular to the radial faces of said bodies, said slots being disposed parallel to a radius but spaced a negative distance therefrom at the circumference of the bodies, and a flat polygonal cutting insert in said slots, having a surface in flat contact with the root surface of said slot and a surface in flat contact with the radial flat surface of said first circular body and a plurality of cutting edges adjacent side surfaces normal to the flat insert, means to hold said insert in said slot, said insert being shaped geometrically to have a cutting surface disposed at an angle to the axis of the said bodies.

2. A boring cutter assembly for a plurality of identical regular polygon, negative cutting edge, flat inserts of cutting material having side surfaces normal to the plane of the insert in combination with said inserts comprising a first circular body having radial flat surfaces normal to the axis of the body, a separable second body positioned against the first body having a plurality of spaced circumferential slots passing normal to the said bodies to terminate adjacent said radial flat surfaces, said slots having flat root surfaces to seat flat against edges of said inserts, said inserts being shaped to have a cutting edge at an angle to the axis of the cutter bodies when seated in said slots.

3. A boring cutter assembly for a plurality of identical, indexable, cutting inserts having parallel side faces in the form of regular five and more sided polygons of equal dimensions, each face lying in a single plane, the edges of the polygon being normal to said faces, said assembly comprising in combination, in addition to the inserts, a first circular body to be mounted in a machine, said body having a flat radial face adjacent its periphery to serve an axial support for one of the edges of an insert, and a second circular body positioned against said first body, said second body having peripheral open-ended slots with sides lying in planes parallel to the axis of the bodies, and parallel to but spaced from a radius of the bodies, the base of said slots serving as a flat root support for one side of said inserts, said inserts having a plane cutter surface with a cutting edge lying at an angle to the axis of the bodies and a trailing edge disposed at a cutting clearance distance radially of said bodies.

4. A cutter assembly as defined in claim 3 in which the first and second cutter bodies each have telescoping portions interfitting with each other, and means to lock the bodies against circumferential displacement.

5. A device as defined in claim 3 in which the root surface of the slots in the second body is disposed at 18° to the axis of the bodies and said inserts are pentagonal inserts.

6. A device as defined in claim 3 in which the root surface of the slots in the second body is disposed at 30° to the axis of the bodies and said inserts are hexagonal inserts.

7. A device as defined in claim 3 in which the root surface of the slots in the second body is disposed at 0° to the axis of the bodies and said inserts are octagonal inserts.

8. A device as defined in claim 3 in which the root surface of the slots in the second body is disposed at 0° to the axis of the bodies and said inserts are circular inserts.

9. For use with a plurality of identical regular polygonal, negative cutting edge, flat inserts of cutting material having side surfaces normal to the plane of the inserts, a boring cutter assembly in combination with said inserts comprising a first circular body having radial flat surfaces normal to the axis of the body, a separable second body positioned against the first body co-axial therewith having a plurality of spaced circumferential slots passing normal to a plane perpendicular to the axis of said bodies, said slots having flat root surfaces to seat flat against edges of said inserts when in said slots, said inserts having also a surface in flat contact with a radial flat surface on the first circular body and being shaped to have a cutting edge disposed at an angle between 30 and 75 degrees to a plane passing normal to the axis of said bodies wherein rotation of said inserts and said bodies relative to adjacent work will move said angled cutting surfaces of said inserts in a path to provide cutting clearance behind the leading cutting edges of said inserts.

References Cited in the file of this patent

UNITED STATES PATENTS

| | | |
|---|---|---|
| 2,645,003 | Thompson | July 14, 1953 |
| 2,805,467 | Greenleaf | Sept. 10, 1957 |
| 2,805,469 | Greenleaf | Sept. 10, 1957 |
| 2,945,288 | Berry | July 19, 1960 |
| 2,989,800 | Comly | June 27, 1961 |